United States Patent [19]

Jackson

[11] 3,816,732

[45] June 11, 1974

[54] APPARATUS AND METHOD FOR SERIAL-PARALLEL BINARY MULTIPLICATION

[75] Inventor: Leland B. Jackson, Monsey, N.Y.

[73] Assignee: Rockland Systems Corporation, West Nyack, N.Y.

[22] Filed: Mar. 29, 1973

[21] Appl. No.: 346,108

[52] U.S. Cl. .......................... 235/156, 235/164

[51] Int. Cl. .......................... G06f 7/39

[58] Field of Search .......................... 235/156, 164

[56] References Cited

UNITED STATES PATENTS

| | | | |
|---|---|---|---|
| 3,582,634 | 6/1971 | Bartlett | 235/164 |
| 3,610,907 | 10/1971 | Taylor | 235/156 X |
| 3,617,723 | 11/1971 | Melvin | 235/156 X |

*Primary Examiner*—Malcolm A. Morrison

*Assistant Examiner*—James F. Gottman

*Attorney, Agent, or Firm*—Robert D. Flynn

[57] ABSTRACT

The bits of the multiplier are multiplied by sequential bits of the multiplicand in ascending order of significance. These sequential products are supplied to a parallel adder, where each bit is added to the delayed sum of the preceding operation of the next higher bit in order of significance, including the carry bit as the most significant. After *k* bits of multiplicand have been used, truncated or rounded output becomes available at the output of the least significant stage of the adder. During the bit interval of the last bit of the multiplicand the outputs of the adder are loaded into a parallel input series output shift register, after which the remaining bits of the product are taken from the output of the shift register, the delayed flipflops associated with the adder are cleared and the adder begins to operate on the next multiplication while the shift register is unloading.

11 Claims, 3 Drawing Figures

APPARATUS AND METHOD FOR SERIAL-PARALLEL BINARY MULTIPLICATION

This invention relates to calculating circuits, more particularly to multiplying circuits for calculating the product of two binary numbers. The type of multiplier here involved is a so-called serial-parallel multiplier, particularly the kind designed to provide a rounded or truncated product limited to a number of bits less than the sum of the number of bits of the two numbers being multiplied.

A typical example of electronic multiplication is the case in which various items of data, each a number having n bits, are to be multiplied by another set of numbers, that may be referred to as coefficients, each having k bits, which are read out of a memory, which may be a read-only memory. It is desirable to keep the number of steps of each multiplication down to a minimum in order to maximize the speed of the operation. There are known methods for accomplishing each multiplication in $n + k$ steps.

The multiplication of a binary number by a single binary digit (which, of course, has to be either 1 or 0) results in either reproducing the number just as it is (multiplication by 1) or producing a string of 0's (multiplication by 0). The operation can therefore be accomplished with a series of AND gates, on one input of each of which the various digits of a binary number are distributed, while on the other input of all of the gates a single digit of the other number is present. The same array of gates can be used for multiplication of successive serial digits by the number applied in parallel. Since one number is presented to the logic in parallel fashion and the other sequentially, multipliers of this type are known as serial-parallel binary multipliers. It is common to refer to the data as the multiplicand and the coefficient obtained from the memory as the multiplier. It is, moreover, convenient to supply the bits of the coefficient in parallel to the input gates and to feed the bits of the data sequentially to these gates.

One of the forms of serial-parallel multiplier already known does the necessary shifting operation by providing a one bit shift (which requires a one bit delay) ahead of one input of each of the adders of the array that forms the successive partial sums. This has the disadvantage that the full $n + k$ bit product must be accumulated before rounding or truncating can occur. Furthermore, the arrangement requires individual serial adders, which is unsuited for the highly compact parallel adders using MSI or LSI technology unless they can be provided with individual, decoupled carry outputs.

Another form of known serial-parallel multipliers provides a one bit shift and delay in advancing the digits of the multiplicand from one input gate to the next instead of having these digits applied simultaneously to all gates. This is the system described by Jackson, Kaiser and McDonald in Vol. AU-16, IEEE Transactions on Audio and Electroacoustics, pp. 416–417 (September 1968). This system also requires the use of individual serial adders and, besides, the bits of the multiplier must be present for staggered periods of time each having the length of n clock periods, the staggering being necessary on account of the progressive delay of the input bits as they go across the array of input gates. This is not convenient when the multiplier is stored in a parallel bit read-only memory.

An object of this invention is to provide a serial-parallel binary multiplier that can make use of an MSI or LSI (integrated circuit) parallel adder. A further object is to provide a serial-parallel adder which can furnish a product limited to n bits in a relatively efficient manner.

SUBJECT MATTER OF THE PRESENT INVENTION

Briefly, a parallel adder has one set of inputs supplied by the input gates which multiply the respective bits of the multiplier by successive bits of the multiplicand. Another set of inputs of the parallel adder is derived by shifting and delaying by one bit the output from the next higher section of the parallel adder in order of bit significance, such input in the case of the most significant ($k$) multiplier bit being the carry output similarly delayed. The result is to provide, at the sum output of the lowest significance order of the adder structure, all the bits of the product, beginning with the least significant. For efficient provision of products limited to a certain number of the most significant bits, a shift register with parallel input and serial output is provided that can be loaded in parallel by the output of the parallel adder as soon as the last (most significant) bit of the multiplicand has been presented to the system. Then the shift and delay flip-flops associated with the parallel adder may be cleared, so that the parallel adder can begin working on the next multiplication while the last $k$ bits of the product are read out serially from the shift register. In some cases only the $k$ most significant bits of the product will be of interest, but if n is greater than $k$, it is common to require $n$ bits of product. In that case the first $k$ bits of a number are disregarded, except that the last may be used for rounding, then the next $n - k$ bits are taken directly from the serial output of the adder, after which the remaining $k$ bits come through the shift register while the first $k$ bits of the next number are being disregarded. Although it may be practical with additional circuitry to include the sign of the multiplicand in the position of its most significant bit, it is desirable to constrain both the multiplier and the multiplicand to positive values and to provide for determination of the sign of the product by an operation outside of the parallel adder.

An illustrative example of the invention is described in more detail by reference to the annexed drawing, in which.

Figures 1, 2:
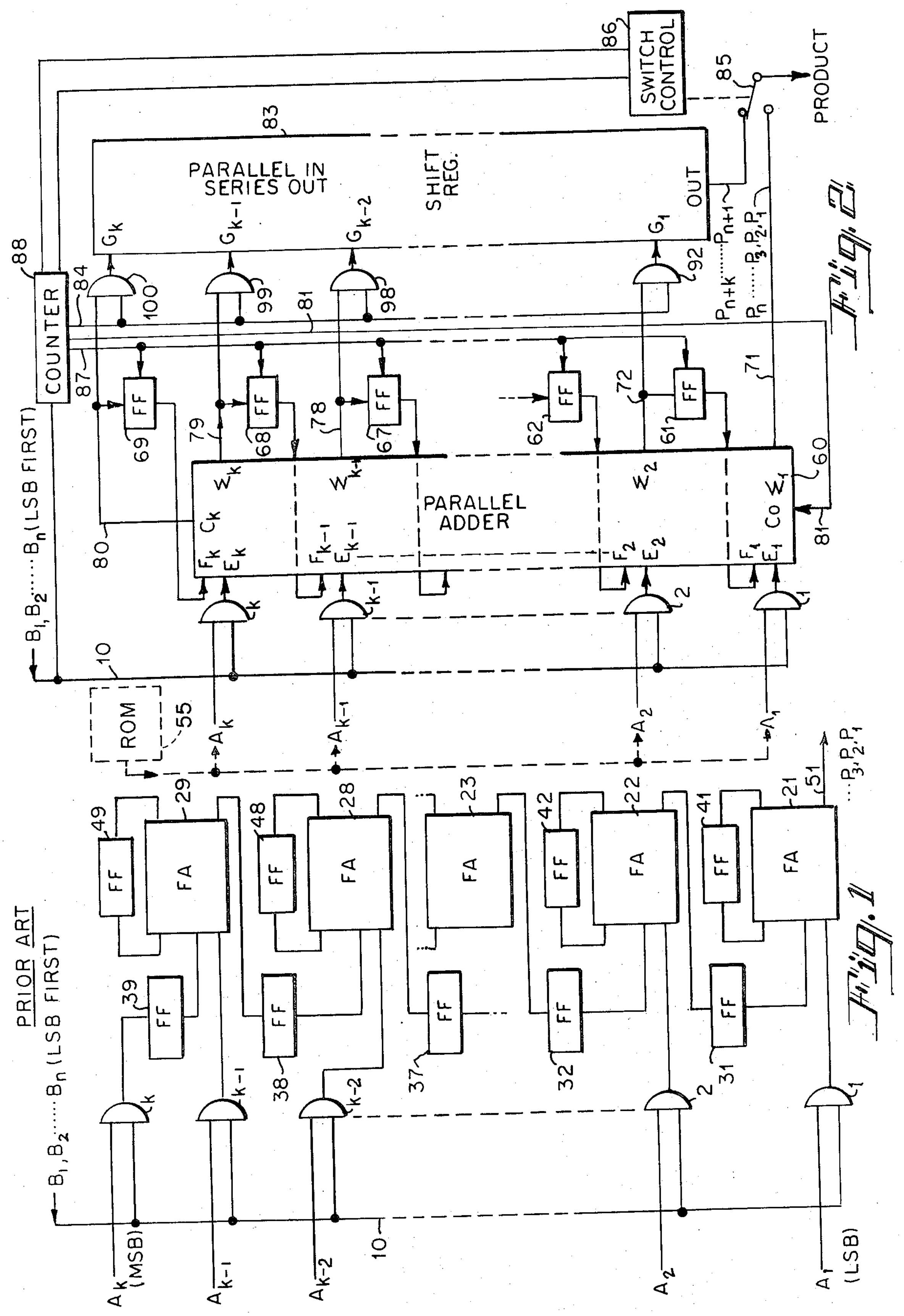
FIG. 1 is a block diagram of the logic of a prior art serial-parallel multiplier using individual serial adders.
FIG. 2 is a block diagram showing the logic of a serial-parallel multiplier embodying the invention and utilizing a parallel adder.

FIG. 1 is a simplified diagram of the serial-parallel multiplication network shown in FIG. 6–25 in Digital Design, by R. K. Richards (John Wiley, New York, 1971) pg. 332. The diagram is simplified by omission of the provision of clock pulses, which are applied to all of the flipflops, and by showing only a single signal input in the flipflops instead of connections for both the normal input and its inverse. There is an array of input gates 1, 2 . . . $k$ − 1, $k$. A multiplicand is supplied to the input gates one bit at a time, beginning with the least significant bit $B_1$, over the conductor 10. The other input of each of the gates receives one of the bits $A_1$, $A_2 \ldots A_{k-1}$, $A_k$ of the multiplier obtained from a read-only memory (not shown). The respective output of gates 1, 2 . . . *k*—2, *k*—1 are provided to an array of full adders 21, 22 . . . 28, 29. The output of gate k is subjected to a one bit delay by flipflop 39 and is provided to full adder 29 by the output of flipflop 39. Since full adder 29 is associated with gate *k*—1, flipflop 39 provides a one bit shift by producing a one bit delay. The full adders 21, 22 . . . 28, 29 are individual serial adders having flipflops 41, 42, 48 and 49 respectively for delayed reinsertion (feedback) of the carry output.

The sum outputs of adders 29, 28 . . . 23, 22 are shifted and delayed one bit by flipflops 38, 37 . . . 32 and 31 respectively, from which they are fed to the next adder down in order of bit significance of the multiplier input, flipflop 38 furnishing its output to full adder 28, flipflop 32 furnishing its output to full adder 22 and flipflop 31 furnishing its output to full adder 21.

When the first bit $B_1$ of the multiplicand, which is the least significant bit of that number, is applied to the input gates, the first bit of the product $P_1$ appears at the output line 51 at the sum output of adder 21. But when the second bit $B_2$ of the multiplicand is applied to the input gates, the product $B_1 A_2$, which was formed by gate 2 and adder 22 during the first step and thereafter stored in flipflop 31, now enters adder 21, where it is added to $B_2 A_1$ to provide the second bit $P_2$ of the product. When the third bit $B_3$ of the multiplicand is applied to the input gates, the adder 21 receives not only the partial sum $B_1 A_3 + B_2 A_2$ from the flipflop 31 to be added to $B_3 A_1$, but also the carry, if any, from the addition involved in forming the product bit $P_2$, furnished through flipflop 41. All these go together to form the third bit $P_3$ of the product. This goes on not only until the last bit $B_n$ of the multiplicand has been applied to the gates, but for *k* additional steps shifting the partial sums remaining in the various adders down towards adder 21.

As pointed out above the arrangement just described has the disadvantage that individual serial adders must be used, each with a flipflop for the carry, and that the scheme is not suitable for the use of a parallel adder without individual, decoupled carry outputs. Furthermore, it is necessary to accumulate the full $n + k$ bit product before dropping off some of the least significant bits, with or without rounding the least significant of the bits of the product which are to be used.

FIG. 2 shows a serial - parallel binary multiplier embodying the present invention. The arrangement of the input gates is the same as in FIG. 1, and the inputs are accordingly similarly identified. As shown in dashed lines, the bits $A_1$, $A_2 \ldots A_{k-1}$, $A_k$ of the multiplier may conveniently and efficiently be supplied from a read only memory 55. The parallel adder 60 may, for example, be composed of SN 7483 four bit adders made by Texas Instruments, in cascade to handle more bits. The adder 60 has two sets of inputs, a first set $E_1$, $E_2 \ldots E_{k-1}$, $E_k$, into which feed the outputs of the respective input gates, and a second set $F_1$, $F_2 \ldots F_{k-1}$, $F_k$, the inputs for which are provided by the shift and delay flipflops 61, 62 . . . 68 and 69. These flipflops are supplied by the signal of the next higher order sum output of the parallel adder. The input to flipflop 69 is simply the carry output 80 from the highest order stage of the adder, and it is provided after a one bit interval delay to the input $F_k$. In this type of parallel adder, the carry from the lower stages simply proceeds up to the next stage instead of having to be delayed and fed back to the same stage. This puts on a requirement that there must be time for the propagation of the carry as far as necessary in the adder, which puts a limit on how fast the clock pulses may succeed each other, but the saving in the compactness of the equipment is well worth this limitation. As in the case of FIG. 1, the provisions for applying the clock pulses are not shown, but it is obvious that the flipflops and the adder stages must proceed in synchronism with the presentation in sequence of the multiplicand bits and then for a number of steps thereafter if the most significant bits are to be brought to the serial output of the adder 60 at conductor 71. If the switch 85 is kept in its lower position, all the bits of the product can thus be obtained serially from conductor 71. In this case, the $C_0$ input shown at the bottom of parallel adder 60 is set at zero (ground) by the conductor 81, since there is no carry to be brought up from a lower stage.

Figure 3:
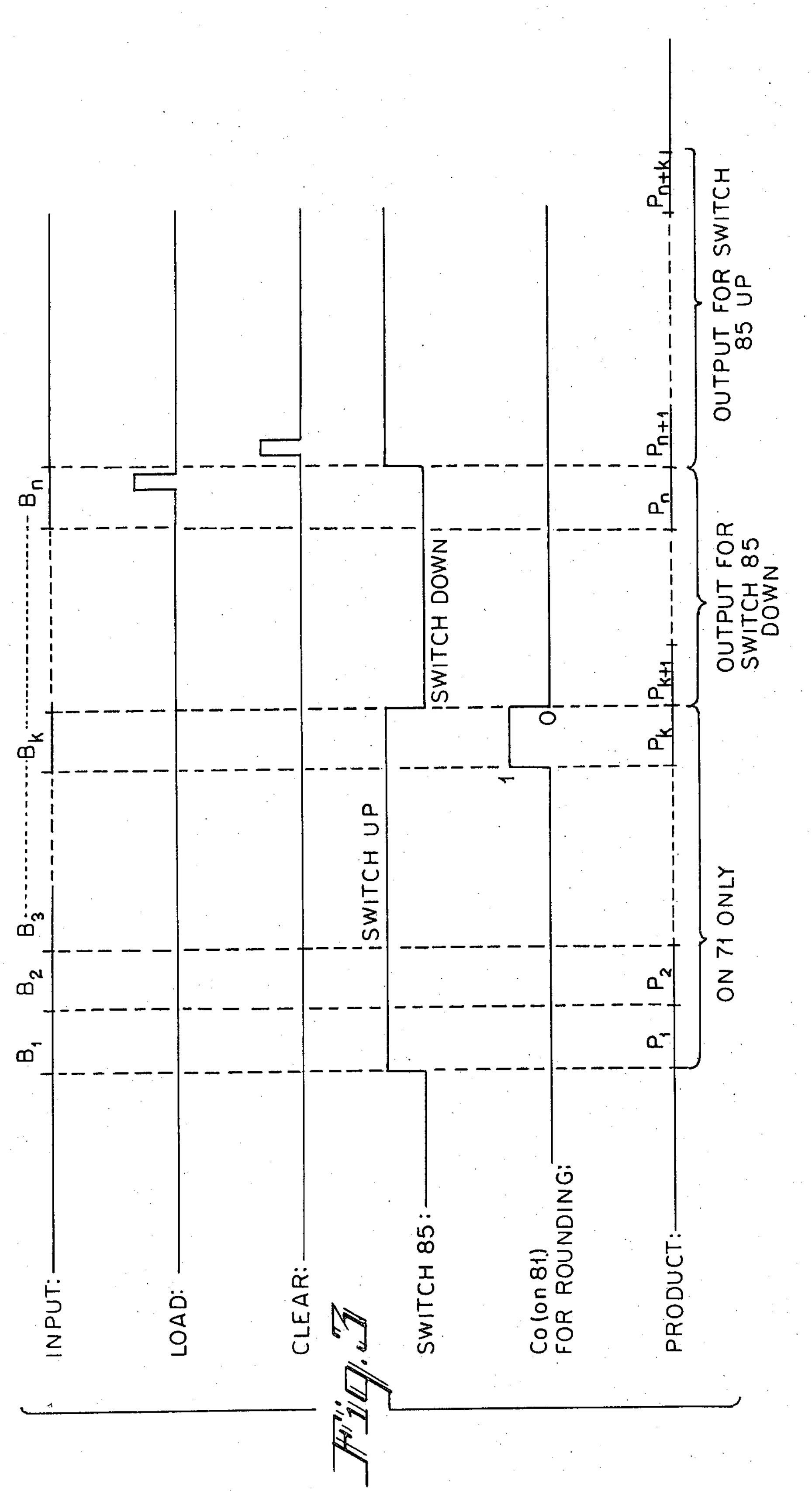
FIG. 3 is a timing diagram defining the control pulses for the apparatus of FIG. 2 with reference to input (multiplicand) and output (product) pulses.

The shift register 83 is a parallel-in, serial-out shift register. An 8-bit device of this class, for example, is made by Texas Instruments with the designation SN 74166. It is loaded through gates 92 . . . 98, 99, 100 from the corresponding sum outputs 72 . . . 78, 79 and carry output 80 of parallel adder 60 when a "load" command signal is provided over conductor 84. That is provided by the counter 88 just after the last bit $B_n$ of the multiplicand has been presented to the input gates as shown in FIG. 3. In this manner the *k* most significant bits of the product are transferred in a single operation from parallel adder 60 to shift register 83, so that shift register 83 can take over the job of spilling out these bits, leaving parallel adder 60 ready for starting work on the next multiplication. In order to make parallel adder 60 ready for the next multiplication, the flipflops 61, 62 . . . 67, 68 and 69 are cleared by a "clear" signal provided by counter over conductor 87 as soon as shift register 83 has had time to load, as shown in FIG. 3.

Switch 85 is placed in its upper position, as shown in FIG. 2, by its control 86 in response to counter 88 as soon as shift register 83 is loaded and remains there while the product digits are serially shifted out of the register. If desired, the serial reading out of shift register 83 may be done in quicker steps than the operations of parallel adder 60, using different or additional clock pulses, so as to be sure that the operation is completed when the first digits of interest in the next multiplication are produced by adder 60. In that manner fewer than *k* digits of the successive products are neglected and the product can show more than n digits, although less than $n + k$ digits.

Commonly there will be no occasion to hurry the output of shift register 83, for example if only the n most significant digits of the product are desired. In that case, as shown in the timing diagram, FIG. 3, the *k* least significant digits can be disregarded and shift register 83 can be unloaded in step with the same clock pulses as are applied to the adder and flipflops. The timing of the control for switch 85 is also shown in FIG. 3. If there is a new multiplication ready at the time of the "clear" signal, the counter 88 resets itself without waiting for the rest of the output to be fed out.

The truncation operation of switch 85 can be changed to rounding of the N-bit product ($P_{k+1} \ldots$ $P_{n+k}$) by having input $C_0$ on conductor 81 equal one during $B_k$, as shown in FIG. 3, which effectively adds a weight of one-half the least significant product bit ($P_{k+1}$) before truncation.

I claim:

1. A serial-parallel binary multiplier comprising:

a parallel adder arranged to receive at one set of inputs the successive products, in ascending order of significance, of a multiplier and one bit of a multiplicand and to receive at a second set of inputs the delayed next more significant sum bit produced by said adder, delayed by a single bit interval of the multiplicand bit delivery sequence by operation of delay means, the carry output of said adder being regarded as the most significant sum bit produced by said adder;

a parallel input series output shift register with input loading gate means adapted to be enabled during a loading pulse, said shift register being arranged to have its cells loaded by the respective sum bits (including said carry output but not necessarily including the least significant sum bit) of said adder, with said sum bits being loaded so that the order of significance of said sum bits corresponds to the order of serial output delay of the cells into which said bits are loaded, and control means, including timing means, for providing said loading pulse just prior to end of the bit interval of the highest significance bit of said multiplicand, for clearing said delay means just after the end of said bit interval and for providing further sequential operations of said adder and said shift register thereafter, regardless of whether another multiplicand is immediately thereafter presented to said adder.

2. A serial-parallel binary multiplier comprising:

parallel adder means having a first ($E_i$) and a second ($F_i$) set of data inputs, a set of outputs ($\Sigma_i$), and a carry output ($C_k$);

gate means (1, 2 . . . $k$) arranged to supply, to said first set ($E_i$) of inputs of said adder means, the product of a multiplier and one bit of a multiplicand;

means for supplying the bits of said multiplier in parallel and the bits of said multiplicand sequentially in ascending order of significance to said gate means;

timing means for timing the sequential supplying of said multiplicand bits and timing successive operations of said adder means and components connected thereto as herein specified at a rate no greater than the maximum operating rate of said adder means;

a set of flipflops (61, 62 . . . 68, 69) arranged to provide a one bit delay between an input and an output of each flipflop, one of said flipflops (69) having its said input connected to said carry output ($C_k$) of said adder means and its said output connected to the highest significance input ($F_k$) of said second set of inputs ($F_i$) of said adder means, and the remaining flipflops of said set (68 . . . 62, 61) having their said outputs connected to an input of said second set of inputs ($F_i$) of said adder means of one order of significance less than that of the product output connected to the input of the same flipflop, said flipflops also having an input for restoring a predetermined initial condition upon receipt of a clearing pulse; and control means associated with said timing means for applying said clearing pulse promptly after the close of the bit interval from which the most significant bit of said multiplicand is supplied to said gate means, whereby a sequential product output is available at the sum output related to the least significant bit inputs and a parallel output limited to k + 1 bits is available during the aforesaid bit interval at the outputs of said adder means ($\Sigma_i$ and $C_k$).

3. A serial-parallel binary multiplier as defined in claim 2 in which said control means is arranged to supply a rounding signal to a carry input of said adder means adapted to add effectively half of the value of the least significant bit position of a parallel output provided by said adder means.

4. A serial-parallel binary multiplier comprising:

parallel adder means having a first ($E_i$) and a second ($F_i$) set of data inputs, a set of outputs ($\Sigma_i$), and a carry output ($C_k$);

first gate means (1, 2 . . . $k$) arranged to supply, to said first set ($E_i$) of inputs of said adder means, the product of a multiplier and one bit of a multiplicand;

means for supplying the bits of said multiplier in parallel and the bits of said multiplicand sequentially in ascending order of significance to said gate means;

timing means for timing the sequential supplying of said multiplicand bits and timing operations of said adder means and components connected thereto as herein specified at a rate no greater than the maximum operating rate of said adder means;

a set of flipflops (61, 62 . . . 68, 69) arranged to provide a one bit delay between an input and an output of each flipflop, one of said flipflops (69) having its said input connected to said carry output ($C_k$) of said adder and its said output connected to the highest significance input ($F_k$) of said second set of inputs ($F_i$) of said adder means, and the remaining flipflops of said set (68 . . . 62, 61) having their said respective inputs connected to an output other than the least significant output of said set of outputs ($E_i$) of said adder and their said respective outputs connected to an input of said second set of inputs ($F_i$) of said adder means of one order of significance less than that of the product output connected to the input of the same flipflop, said flipflops also having an input for restoring a predetermined initial condition upon receipt of clearing pulse;

a parallel in series out shift register provided with a second gate means (92, 93 . . . 99, 100) for its parallel inputs adapted to be enabled during application of a loading pulse, said parallel inputs being connected through said gate means so that the cell ($G_k$) of said shift register the parallel loaded content of which is last to be discharged through the serial output is connected to said carry output ($C_k$) of said adder means and the remainder, in descending order of output delay, are connected respectively to the set of outputs ($\Sigma_i$), not necessarily including the least significant, of said adder means in descending order of significance; and control means for applying said loading pulse to said second gate means after the most significant bit of said multiplicand has been effectively entered into said first gate means and prior to the next step of said timing means and for applying said clearing pulse to said flipflops promptly after said last mentioned step of said timing means and leaving time for said flipflops to be operated by said adder means prior to the next subsequent step of said timing means.

5. A serial-parallel binary multiplier as defined in claim 4 in which the least significant output of said set of outputs ($\Sigma_i$) of said adder means is not connected to said second gate means and in which means are provided for obtaining output pulses selected from said least significant output and from the series output of said shift register.

6. A serial-parallel binary multiplier as defined in claim 5 in which means are provided for obtaining output pulses selectively from said least significant output of said adder means and from said series output of said shift register under control of said control means so arranged as to take output from said least significant output of said adder means after the supplying to said first gate means of a number of bits of said multiplicand equal to the number of bits in said multiplier until the end of the bit interval in which the most significant bit of said multiplicand is supplied to said first gate means, and then taking output from said serial output of said shift register during the serial unloading of said shift register.

7. A serial-parallel binary multiplier as defined in claim 6 in which said control means is arranged so as to supply a pulse to a carry input of said adder means during the bit interval immediately preceding the first bit interval from which output is taken from said least significant output of said adder means as aforesaid, whereby a rounded product rather than a truncated product may be formed by the output pulses.

8. A serial-parallel binary multiplier as defined in claim 7 having read only memory means for supplying bits of said multiplier in parallel to said first gate means.

9. A serial-parallel binary multiplier as defined in claim 7 in which means are provided for successively supplying a succession of multiplicand bit sequences to said first gate means and in which said control means is adapted and arranged to reset itself immediately after the bit interval of the most significant of each bit multiplicand.

10. A method of performing successive binary multiplications comprising the steps of:

multiplying electrical signals representing the bits of the multiplier by a sequence of electrical signals representing the bits of the multiplicand in ascending order of significance;

supplying each such product successively in parallel to a parallel adder and adding thereto the delayed output of the next preceding operation, if any, of the next higher stage of said adder in order of bit significance, treating the carry output of said adder as the most significant output;

forming the desired product by taking output pulses from the least significant stage of said adder beginning after the use of a number of multiplicand bits equal to the number of bits in the multiplier and ending during the bit interval of the most significant bit of the multiplicand;

transferring the outputs of said adder other than the least significant one in parallel to a shift register during the bit interval of the most significant bit of the multiplicand, then clearing paths supplying delayed inputs to said adder and taking the remaining bits of the desired product by serial unloading of the shift register while proceeding with the next multiplication if another multiplicand is available for the operation.

11. A method as defined in claim 10 in which a rounding pulse is added through a carry input of the least significant stage of said adder during the last bit interval before product pulses are taken from said least significant stage of said adder.

* * * * *